United States Patent [19]

Koenig et al.

[11] Patent Number: 5,454,764

[45] Date of Patent: Oct. 3, 1995

[54] MANUAL TRANSMISSION CONTROL

[75] Inventors: Melissa M. Koenig, Ann Arbor; William J. Vukovich; Robert L. Moses, both of Ypsilanti, all of Mich.

[73] Assignee: General Motors Corporation, Detroit, Mich.

[21] Appl. No.: 162,504

[22] Filed: Dec. 3, 1993

[51] Int. Cl.⁶ .................................................. F15B 13/044
[52] U.S. Cl. ........................... 475/131; 475/134; 475/135
[58] Field of Search ...................................... 475/116, 121, 475/128, 130, 131, 134, 135; 137/625.69, 625.17

[56] References Cited

U.S. PATENT DOCUMENTS

| | | | |
|---|---|---|---|
| 4,754,666 | 7/1988 | Inagaki | 475/131 |
| 4,779,512 | 10/1988 | Leonard | 137/625.69 X |
| 5,113,725 | 5/1992 | Tomomatsu et al. | 475/116 X |

*Primary Examiner*—Charles A. Marmor
*Assistant Examiner*—Peter Kwon
*Attorney, Agent, or Firm*—Donald F. Scherer

[57] ABSTRACT

A transmission has a manual selector valve which is reciprocally and rotatably mounted in a valve body and operable in a conventional "H" shift pattern to permit selection of first through fifth forward drive conditions, a neutral condition and a reverse drive condition in a planetary transmission. The selector valve has a line pressure chamber formed thereon that remains in fluid communication with a line feed passage in the valve body throughout the "H" pattern. This line pressure chamber is selectively alignable with respective clutch and brake apply passages formed in the valve body to control the flow of pressurized oil for the engagement of respective clutches and brakes. A plurality of exhaust chambers formed therein are also selectively connectible with the clutch and brake apply passages to control disengagement of the respective clutches and brakes not required for the selected drive condition.

2 Claims, 6 Drawing Sheets

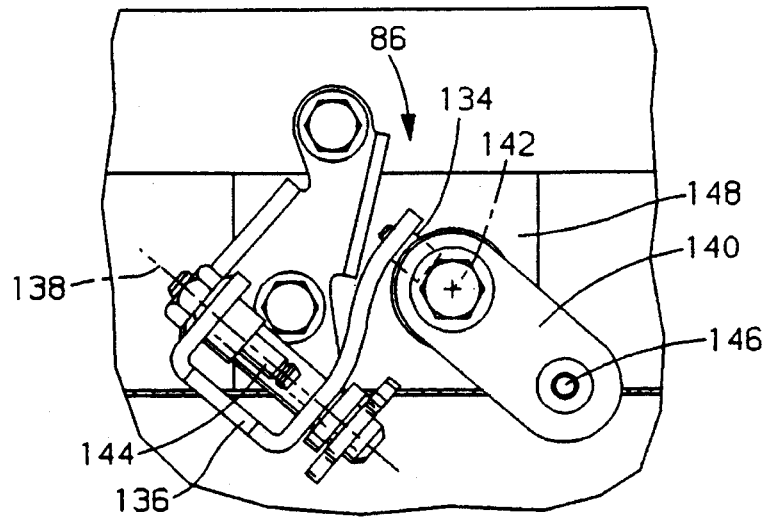
FIG. 2
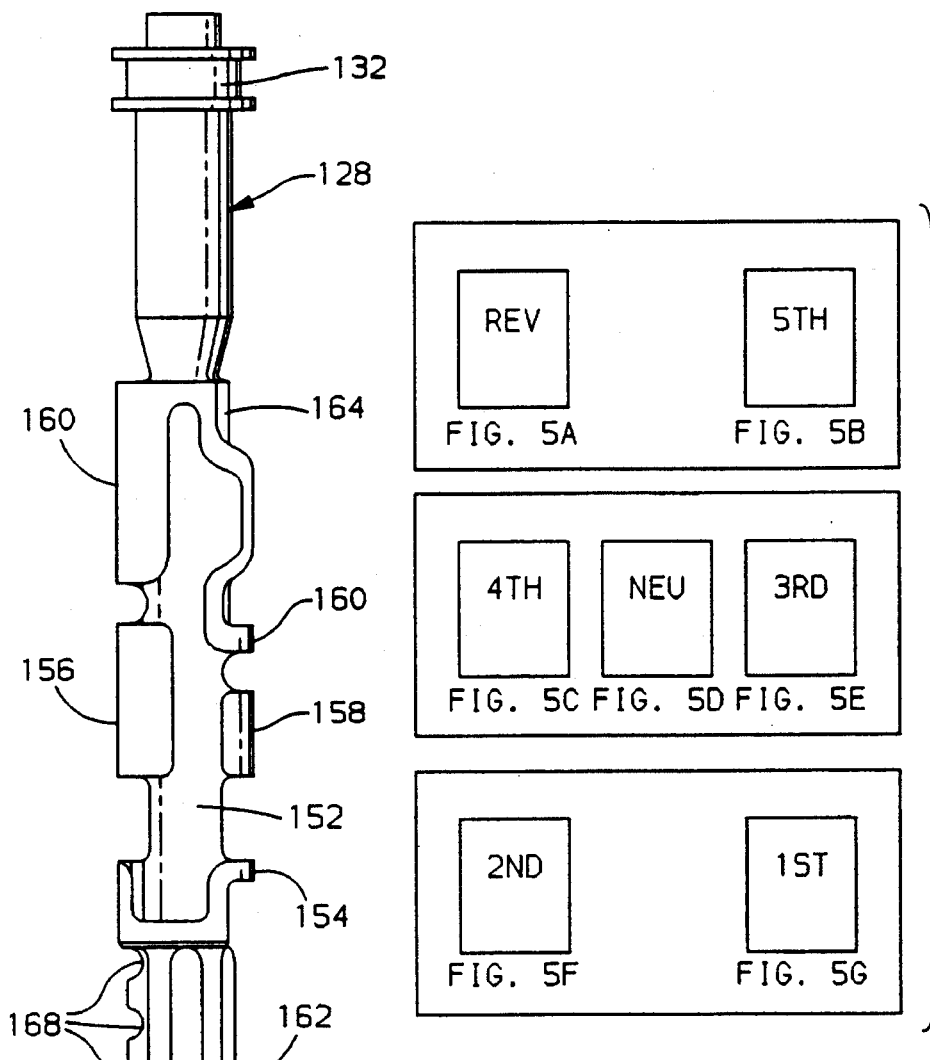
FIG. 3
FIG. 4

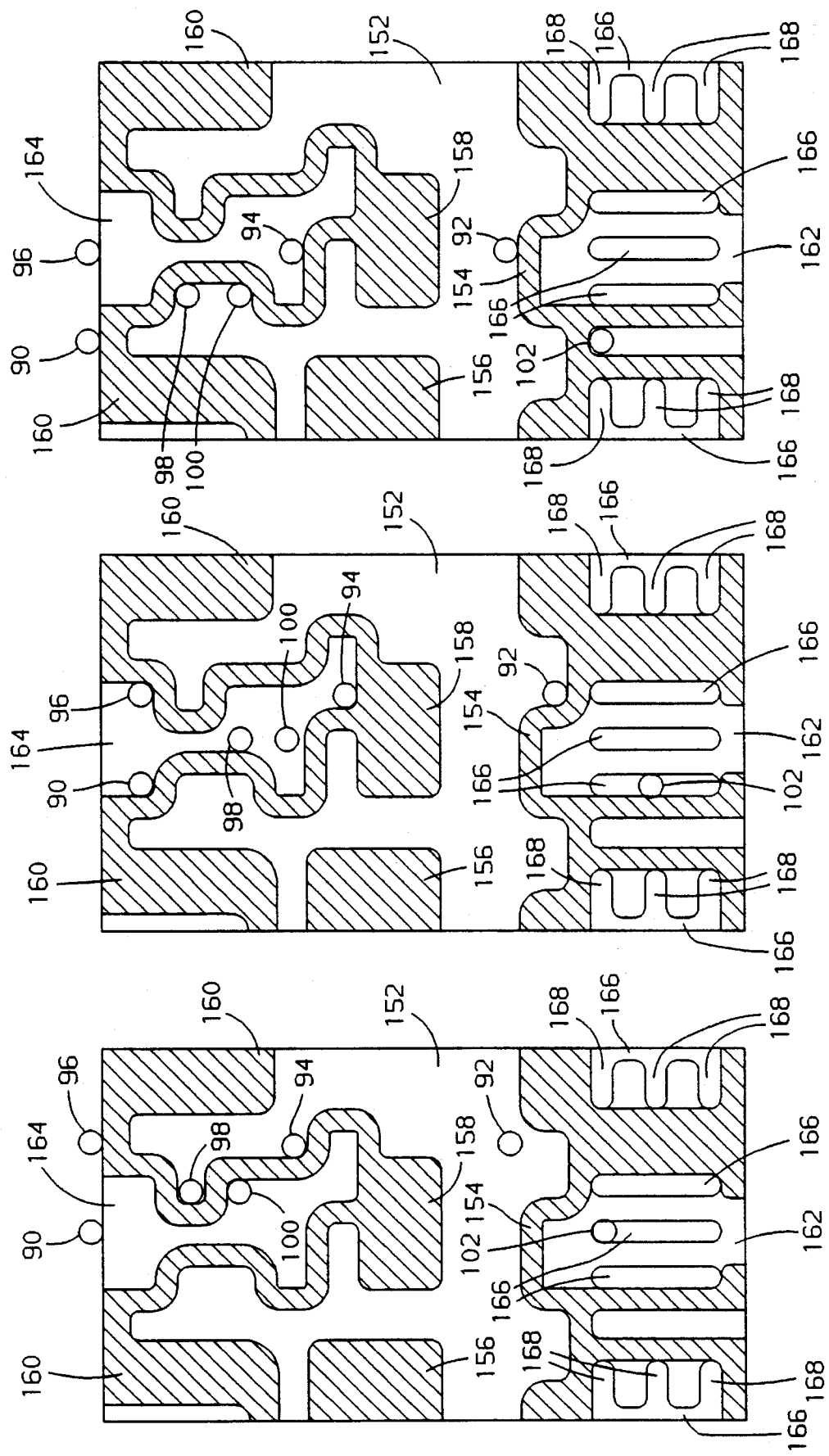

5,454,764

MANUAL TRANSMISSION CONTROL

TECHNICAL FIELD

This invention relates to transmission controls, and more particularly, to manual selector valves for multi-speed power transmissions.

Specifically, this invention relates to a manual control valve for a planetary type transmission operated in a purely mechanical gear selection scheme.

BACKGROUND OF THE INVENTION

Manually controlled planetary transmissions have been proposed in the past. These transmissions have been controlled with a manual valve having substantially the same structure as manual valves used with comparable automatic shifting planetary transmissions. These valves use straight line or linear movement to establish the passages to be connected with the high pressure or main pressure circuit so that appropriate clutches and brakes are actuated. While these mechanisms perform satisfactorily, they do require more space in the longitudinal direction of the selector lever travel when compared with the "H" pattern of a conventional manual control used with a countershaft type transmission.

SUMMARY OF THE INVENTION

The present invention provides an "H" pattern in a manual control for a planetary type transmission. The transmission uses an input clutch in place of a torque converter. To compensate for the reduction in overall torque ratio coverage, an underdrive ratio is provided by placing a two speed planetary at the input axis of the multi-speed planetary. This planetary set will provide for increased torque ratio in both the forward ratios, except for the highest, and the reverse ratio.

The "H" shift pattern reduces the longitudinal space required by the shift mechanism by adding rotary movement to the manual shift valve. The formation of a pressure chamber on the manual valve permits the porting of high pressure fluid to the appropriate clutches and brake members. Exhaust chambers are interspersed with and adjacent to the pressure chamber to allow depressurization of the clutch and brake members not required to establish the operator selected ratio.

It is an object of this invention to provide an improved manual selector valve for a transmission using fluid operated friction devices, wherein a spool valve is mounted for rotary and longitudinal movement in a valve body, such that an "H" pattern is employed by the operator.

It is another object of this invention to provide an improved manual shift valve assembly operable in a "H" pattern for controlling the ratio selection in a planetary transmission having a plurality of selectively engageable fluid operated friction clutches and brakes.

It is a further object of this invention to provide an improved manual shift valve assembly as set forth in the above objects, wherein the manual shift valve has a pressure chamber selectively alignable with the ports for selectively directing pressurized fluid to the clutches and brakes.

These and other objects and advantages of the present invention will be more apparent from the following description and drawings.

DESCRIPTION OF THE DRAWINGS

FIG. 2 is a view taken along line 2—2 of FIG. 1.

FIG. 3 is a side view of a spool valve of a manual selector valve assembly utilized with the present invention.

FIG. 4 is a layout of the positions of FIGS. 5A through 5G.

FIGS. 5A through 5G are diagrammatic representations of the valve positions and port alignment in the selector valve constructed in accordance with the present invention.

DESCRIPTION OF THE PREFERRED EMBODIMENT

Figure 6:
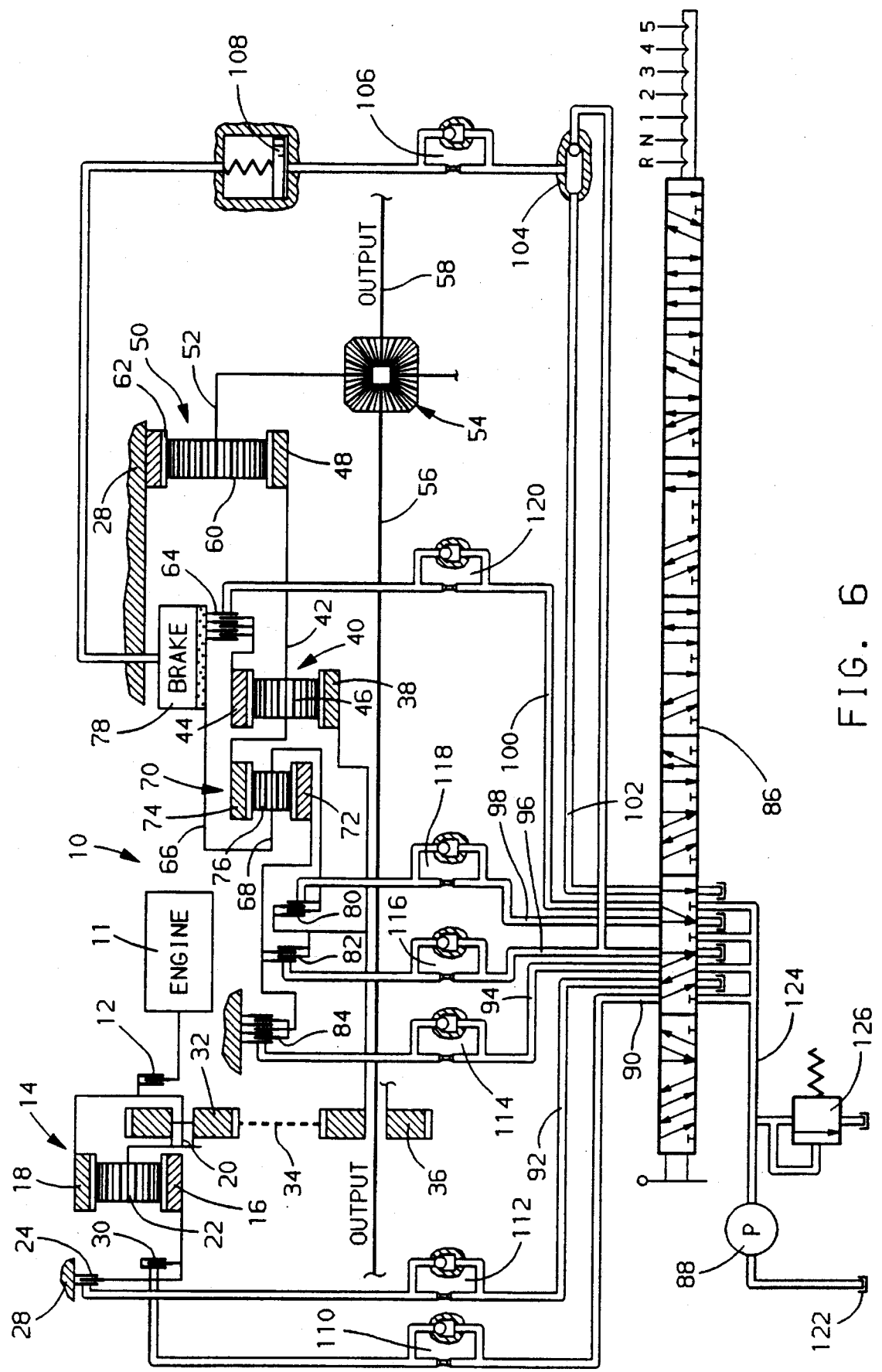
FIG. 6 is a schematic diagram of a transmission gear scheme and control utilizing the present invention.

Referring to the drawings, and in particular FIG. 6, there is shown a planetary gear arrangement or transmission 10 driven by a conventional internal combustion engine 11. The planetary transmission 10 is controlled by a plurality of clutches and brakes and may be constructed similar to the gearing arrangement shown in U.S. Pat. No. 5,197,355, issued Apr. 30, 1993, and assigned to the assignee of the present application.

The engine 11 is drivingly connected to a selectively engageable clutch 12 which is preferably manually operated. The output of the clutch 12 is connected to a planetary gear set 14 having a sun gear 16, a ring gear 18 and a carrier 20 on which is rotatably mounted a number of pinion gears 22 meshing with the sun gear 16 and ring gear 18.

A fluid operated brake 24 is selectively engageable to connect the sun gear 16 to a transmission housing 28. The sun gear 16 and carrier 20 are selectively interconnectible with a fluid operated friction clutch 30 which when engaged will cause a 1:1 drive within the planetary gear set 14.

The clutch 12 is selectively connectible between the engine 11 and the ring gear 18 to provide an input to the planetary gear set 14. The planet carrier 20 is drivingly connected with a sprocket 32 which is, in turn, drivingly connected through a chain 34 with an input sprocket 36. When the brake 24 is engaged, a reduction drive is provided in the planetary and the sprocket 32 is rotated slower than the engine output. If the clutch 30 is engaged and the brake 24 disengaged, the sprocket 32 is rotated at a speed equal to the engine output and therefore provides a 1:1 input through the sprocket 36.

The sprocket 36 is drivingly connected to a sun gear 38, which is an input member for a planetary gear set 40. The planetary gear set 40 also includes a planet carrier 42 and a ring gear 44. The planet carrier 42 supports a plurality of pinion gears 46 which mesh with the sun gear 38 and the ring gear 44. The planet carrier 42 is drivingly connected with a sun gear 48 which is the input member for a final drive reduction set 50. The reduction set 50 has a carrier output member 52 which is drivingly connected through a conventional differential 54 to a pair of output shafts 56 and 58. The output shafts 56 and 58 are connected in a well known manner to the drive wheels of the vehicle. The carrier 52 supports a plurality of pinion gears 60 which mesh with the sun gear 48 and a ring gear 62 which is secured to the transmission housing 28.

The ring gear 44 is connected to a selectively engageable clutch 64. The clutch 64 is connected to a hub member 66 which is connected to a planet carrier 68 of a planetary gear set 70. The planetary gear set 70 includes a sun gear 72, a ring gear 74 and a plurality of pinion gears 76 rotatably supported on the carrier 68 and meshing with the sun gear 72 and the ring gear 74.

The hub 66 has operatively and selectively connectible therewith a fluid operated friction brake 78. The brake 78 will restrain rotation of the carrier 68 and, when the clutch 64 is engaged, the ring gear 44 is also restrained. The carrier 68 is also operatively connected with a clutch 80 which is a fluid operated device selectively operable to provide a drive connection between the input sprocket 36 and the carrier 68.

The sun gear 72 is selectively connectible with the input sprocket 36 through a selectively engageable clutch 82. The sun gear 72 may also be selectively restrained from rotation by a fluid operated selectively engageable friction brake.

The clutches 30, 64, 80 and 82, and the brakes 78, 84 and 24 are conventional fluid operated friction devices which are well known in the art. These devices generally have a fluid operated piston which is pressurized to control the engagement of the friction members associated with the clutches and brakes.

To effect engagement or actuation of the clutches and brakes, a manual valve 86 is provided. This selectively movable manual valve 86 is operable to deliver fluid from a conventional fluid pump 88 to the various clutches and brakes through a plurality of passages 90, 92, 94, 96, 98, 100 and 102. The passages 96 and 102 are both in fluid communication with a shuttle valve 104 which is operable to deliver the highest fluid pressure in these two passages through a conventional ball check and restrictor 106 to a servo piston 108 which is operable to engage the brake 78.

The passage 90 is disposed to provide fluid communication through a conventional ball check and restrictor 110 to the clutch 30. The passage 92 is connected to deliver fluid pressure through a conventional ball check and restrictor 112 to the brake 24. The passage 94 is disposed to provide fluid communication through a conventional ball check and restrictor 114 to the brake 84. The passage 96 is disposed to provide fluid pressure through a conventional ball check and restrictor 116 to the clutch 82, as well as to the shuttle valve 104.

The passage 98 is directed to connect pressure through a conventional shuttle valve and restrictor 118 to the clutch 80. The passage 100 is operatively connected to direct fluid pressure through a conventional check valve and restrictor 120 to the clutch 64. The passage 102, as previously described, directs fluid pressure to the shuttle valve 104.

The pump 88 takes fluid from a conventional reservoir 122 for delivery to a mainline or high pressure passage 124. The pressure level in the passage 124 is established by a conventional pressure regulator valve 126. These types of valves are well known and the controls that may be utilized therewith are also well known.

The passage 124 delivers line pressure to the manual valve 86 which is operable to connect the high pressure fluid to the individual passages 90 through 102, or to control exhausting of these passages, depending upon the driver selected position. The driver may select a reverse position R; a neutral position N; a first gear position 1; a second gear position 2; a third gear position 3; a fourth gear position 4; or a fifth gear position 5.

Figure 1:
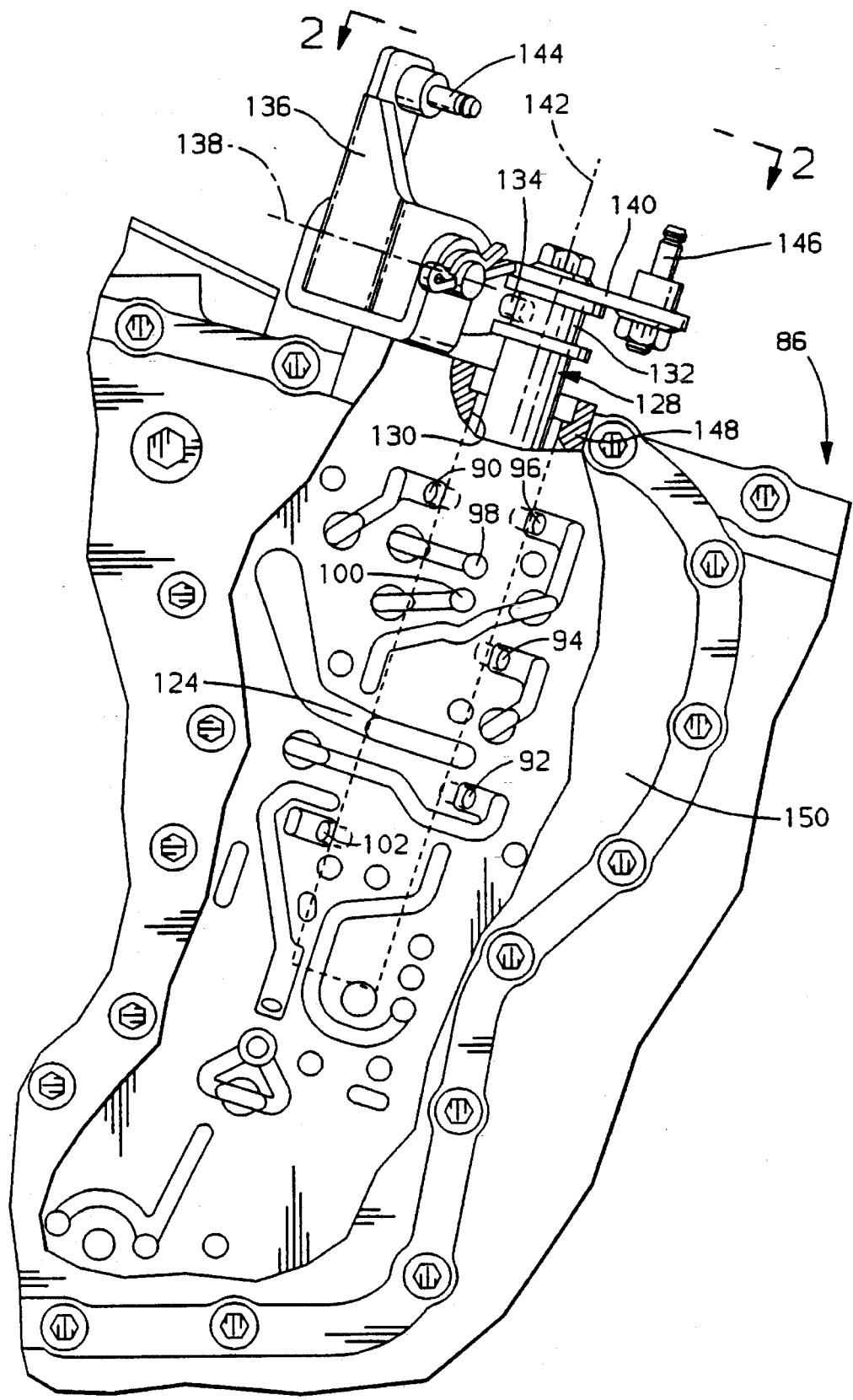
FIG. 1 is a plan view of a portion of a transmission control depicting the input structure of a manual control valve.

While the schematic representation of Figure 6 depicts the manual valve 86 as moving linearly, it is with the present invention moved in an "H" pattern through the control mechanism shown in FIGS. 1 and 2. In FIGS. 1 and 2, it can be seen that the manual valve 86 includes a spool valve or shift valve 128 that is slidably and rotatably disposed in a valve bore 130.

The shift valve 128 has impressed thereon or otherwise secured thereto a collar member 132 which is engageable by a pin 134 controlled by a lever 136. The lever 136 is rotatable about an axis 138 which causes linear movement of the shift valve 128 through the interaction of the collar 132 and the pin 134. The shift valve 128 is also secured to a lever 140 which is operable to provide rotary movement of the shift valve 128 about an axis 142.

The levers 136 and 140 each have a connector portion 144 and 146, respectively, which are connected to a conventional input shift mechanism, such as cables. These devices for controlling the input movement to a countershaft type transmission are well known and have been utilized for a number of years. It is one of the advantages of the present invention that similar controls can be used with this fluid operated planetary gear transmission to provide the "H" shift pattern which is useful in limiting the longitudinal movement of the shift valve 128 and impose the rotational shift movement thereon.

The valve bore 130 is formed in a valve body 148 which has incorporated therein a plurality of conventional worm tracks which are then covered with a plate 150. The worm tracks are operable to direct fluid pressure to the valve bore 130 and also to connect the valve bore 130 to an exhaust passage when the valve 128 is moved to the desired locations by the operator.

The valve bore 130 is connected to the line pressure in passage 124 and to exhaust at a number of locations at both ends of the valve bore. The valve bore is connected to the passages 90 through 102 at the ports shown on FIG. 1.

The shift valve 128 has a line pressure chamber 152 formed thereon. As best seen in FIG. 3, the chamber 152 is bounded by a plurality of land portions 154, 156, 158 and 160 which prevent the direct communication of fluid pressure in the chamber 152 with exhaust passages or exhaust areas which are formed at 162 and 164.

The shift valve 128 is movable in a conventional "H" shift pattern, as suggested in FIG. 4. As seen in FIG. 4, the levers 136 and 140 can be manipulated to cause the valve 128 to assume the neutral position along the center of FIG. 4 or a first position, a second position, a third position, a fourth position, a fifth position or a reverse position. These positions correspond to the positions suggested in FIG. 6 for the manual valve 86. As seen in FIG. 4, however, a more conventional "H" pattern is provided with he present invention.

For ease of discussion, the operative part of the shift valve 128 is shown in layout in FIGS. 5A through 5G. In these representations, the valve 128 has been unwrapped and the port locations shown in FIG. 1 have been superimposed thereon to make it easier for the reader to determine which of the passages is pressurized and which is exhausted.

As seen in FIG. 5D, the Neutral position for the valve, all of the passages, with the exception of passage 92, are connected to exhaust. Thus, in this condition, the only device which is actuated or energized, is the brake 24. The actuation of brake 24 in and of itself will not provide any drive condition in the transmission. It will, however, condition the planetary gear set 14 for the underdrive ratio.

Figure 5B:
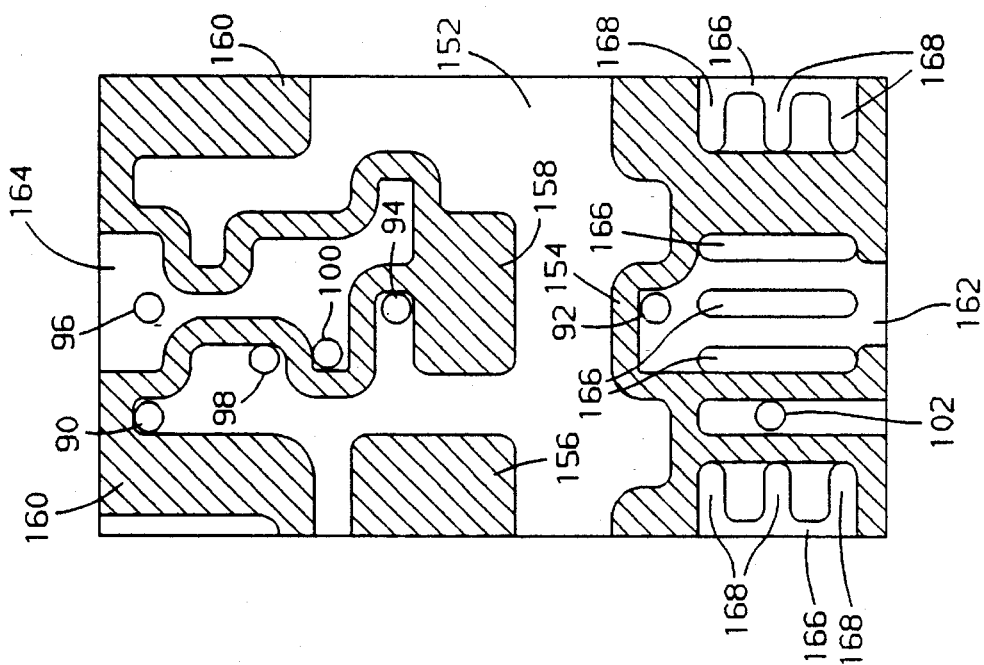
Figure 5A:
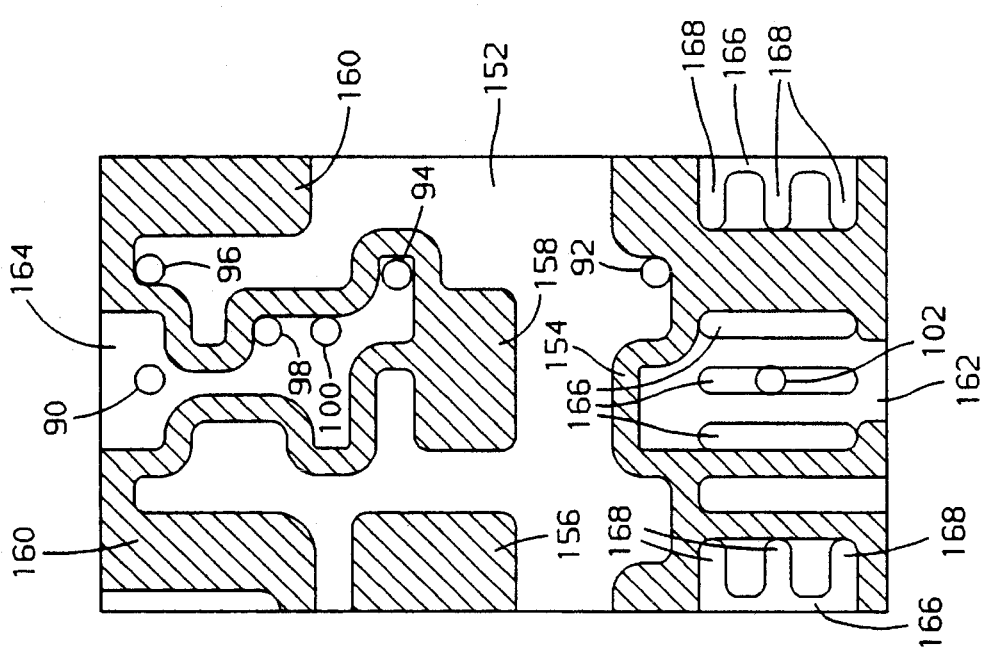
Figure 5G:
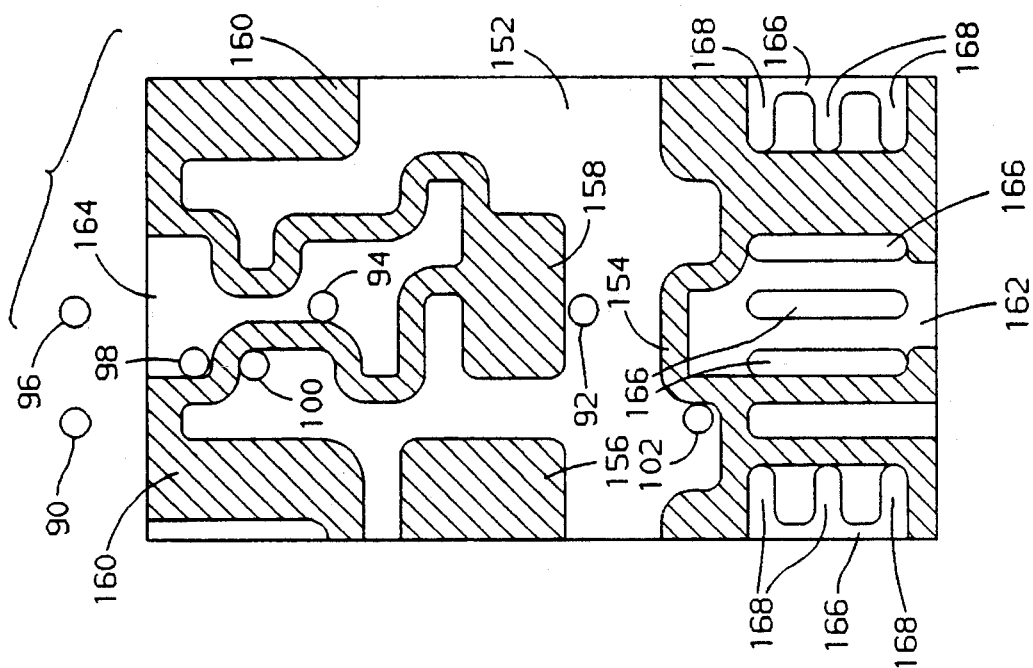
Figure 5F:
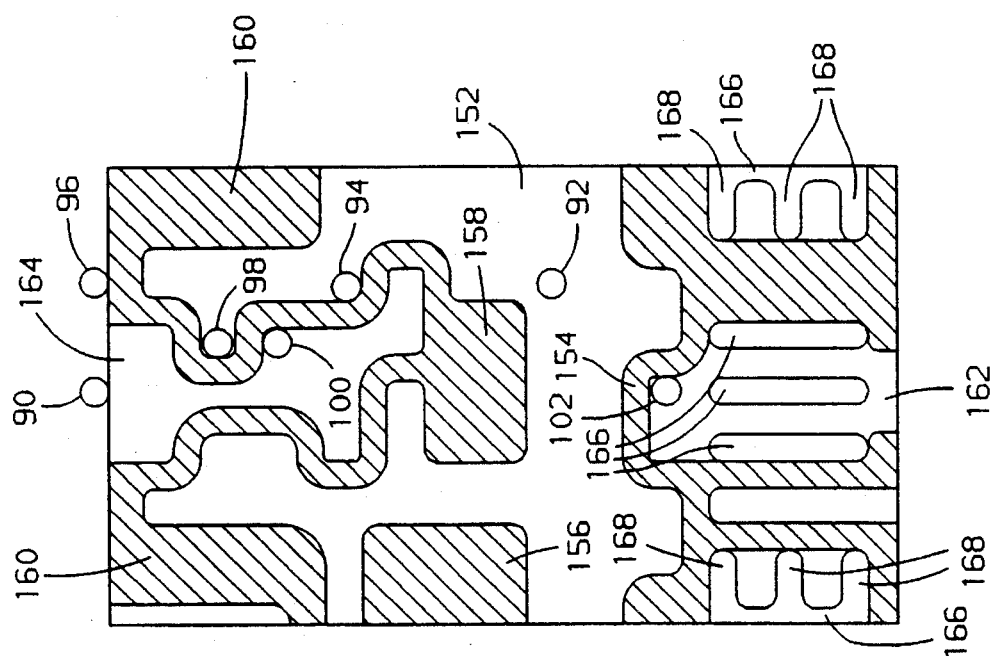

With the manual clutch 12 disengaged, the valve 128 can be moved longitudinally in the Neutral position to the location between FIGS. 5A and 5B, or between FIGS. 5C and 5E, or between FIGS. 5F and 5G. This is a well known Neutral condition in which the selector valve is moved from first to second to third, etc., in a standard or conventional manual transmission using a countershaft type arrangement.

If the valve spool is moved from the FIG. 5D position to the location between FIGS. 5F and 5G, one will appreciate that the only passage pressurized is 92. However, should the operator rotate the valve to select the disposition as shown in FIG. 5G, the transmission will be conditioned for the first or lowest gear by providing pressure to passages 102, 100 and 92. In this condition, the clutch 64 is engaged and the brake 78 is engaged, thus conditioning the planetary arrangements 40 and 70 for the low ratio and the maximum torque output will be provided.

The operator will control the power flow from the engine to the transmission through the selective engagement of the clutch 12. When it is desired to change gear ratios, the operator will disengage the clutch 12 and rotate the shift valve from the position 5G through Neutral to the position 5F which is the second gear.

In this position, the passages 92, 94 and 100 are pressurized while the remaining passages are exhausted. The pressurization of these passages will cause the engagement of brake 24, clutch 64 and brake 84 which will condition the transmission for the second ratio, and the brake 78 will be disengaged through the manual valve by exhausting passages 102 and 96.

From the second gear position, the valve 128 is rotated back to the Neutral slot, moved longitudinally to the position 5D and then rotated to the position 5E which is the third forward ratio. In this position, the passages 92, 98 and 100 are pressurized while the remaining passages are exhausted. The passage 92 energizes or engages the brake 24, the passage 98 engages the clutch 80 and the passage 100 engages the clutch 64. The engagement of the clutches 80 and 64 simultaneously, imposes a 1:1 drive relationship within the planetary gear sets 70 and 40 and a reduction of the planetary gear set is established at the planetary gear set 14. This is the third forward gear operation.

To move from third to fourth, the valve 128 is rotated through the Neutral position 5D to the fourth gear position 5C. In this position, the passages 92, 94 and 98 are pressurized and the passage 100 is exhausted. The passage 94 will energize the brake 84 which will establish the sun gear 72 as a reaction member, while the engagement of clutch 80 via passage 98 will establish the carrier 68 as an input. This will establish an overdrive ratio in the planetary gear set 70, such that the ring gear 74, which is connected to the final drive differential through the carrier 42, will cause an increase in drive ratio from the third gear to the fourth gear.

To establish the fifth forward ratio, the valve 128 is rotated to the position 5D and moved longitudinally to the position between 5A and 5B and rotated into the position 5B. In the position 5B, the passages 90, 94 and 98 are pressurized and the passage 92 is exhausted. The exhausting of passage 92 disengages the brake 24 while the pressurizing of passage 90 engages the clutch 30 thereby establishing a 1:1 drive ratio in the planetary set 14. The energization of passage 94 and 98 create the overdrive ratio in the planetary gear set 70 which was described above for fourth gear. However, due to the 1:1 ratio in the planetary set 14, the output speed will increase for the same input speed and a fifth forward ratio is established.

To establish the reverse drive ratio, the valve 128 is moved longitudinally in the Neutral slot as defined in FIG. 5D to the position opposite FIG. 5A. From here, the valve 128 is rotated through manipulation of the lever 140 to establish the reverse drive position as shown in FIG. 5A. In this position, the passages 92 and 96 are pressurized. The passage 92 establishes the engagement of brake 24, and therefore an underdrive ratio in the planetary set 14, while the passage 96 establishes engagement of the clutch 82 and, via the shuttle valve 104, the engagement of brake 78. This establishes the sun gear 72 as the input member in the planetary set 70 and the carrier 68 as the reaction member resulting in a reverse drive at the ring gear 74 which is connected to the final drive 50. Thus, a reverse drive is established.

The passage 124, as previously described, is connected to the chamber 152. The passage 124 preferably includes an annular chamber in the valve body 148 encircling the valve 128. During longitudinal movement of the valve 128, the passage 124 remains in fluid communication with the chamber 152 between the lands 154, 156 and 158. As can be seen in FIG. 3 and in the layout represented in FIGS. 5A through 5G, the area of chamber 152 is continuous in an annular fashion between these various lands. The lands also provide longitudinal patterns in chamber 152 such that the fluid pressure in the main line 124 is permitted to communicate with the selected passages as the valve is moved linearly and rotatably.

It should be appreciated from the above description that had the valve 128 been a conventional valve spool, the linear movement would have been considerably greater, thus requiring substantially more space for the shift lever and for the valve element itself. The utilization of the "H" pattern in a planetary type transmission requires a unique pressure chamber in the valve spool, such that the selected passages can be pressurized and exhausted with small movements either linearly or rotatably of the valve 128. The present invention accomplishes this with the use of a pressure chamber 152 and the positioning of the exhaust passages 162 and 164.

The valve spool in the area of exhaust 162 is shown to have a plurality of longitudinal recesses 166 and circumferential recesses 168. These recesses will accommodate ball detent members which will assist in maintaining the valve spool in the desired shift location. The use of ball detent mechanisms or spring detent mechanisms is well known and it is not believed that a further description is required. Those familiar with the art will recognize that a ball member is spring loaded into engagement with the recess 166 and will allow the shift valve 128 to move longitudinally.

If a ball detent is similarly engaged in one of the circumferential recesses 168, the longitudinal movement is restricted and only circumferential movement is permitted. Thus, as a general rule, the detent force of the ball in a recess 168 is greater than the detent force of the ball in a longitudinal recess 166. Movement through the Neutral condition is substantially free along one of the recesses 166 which permits the longitudinal movement in the Neutral condition. When a gear ratio has been selected from Neutral, the detented position in one of the circumferential recesses 168 greatly restricts the longitudinal movement of the valve 128.

As suggested previously, these are well known devices and it is not believed that it is necessary at this point to provide any further discussion of this structure.

The mechanical connections at the levers 136 and 140 can be the push-pull type cable, as suggested previously, or the more rigid type mechanisms that are utilized with manually shifted transmissions. As is well known, the manual shift lever can be incorporated in a floor shift console or in a steering column mounted shift lever. Both of these arrangements will work satisfactorily with the present invention.

The manual input clutch 12 can be a spring loaded type clutch with a mechanical linkage between the operator and the clutch pressure plate or a hydraulic linkage which is operated by a foot pedal between the operator and the pressure plate of the clutch. These devices are well known and those skilled in the art will appreciate the many forms which they may take.

The embodiments of the invention in which an exclusive property or privilege is claimed are defined as follows:

1. A manual selector valve in a transmission and control having a source of pressure, a plurality of drive ratios established with the engagement of fluid operated friction devices, said manual selector valve comprising:

a valve body portion having a bore including a main passage communicating with said bore and said source of pressure, a plurality of control passages communicating with said bore and respective ones of said fluid operated friction devices;

a valve spool means slidably disposed in said bore for independent reciprocal and rotary movement to a plurality of operating positions determined by the combined movements for providing selective communication between said source and selective combinations of said passages through a pressure chamber formed on said valve spool means and bounded by said bore to control fluid distribution from said source to selective ones of said fluid operated friction devices and selective fluid communication between an exhaust chamber means formed on said valve spool means, and the passages disconnected from said source to exhaust said fluid operative friction devices communicating with the disconnected passages.

2. The manual selector valve defined in claim 1 further comprising:

first lever means for selectively enforcing the independent reciprocal movement of said valve spool means to at least three distinct positions; and second lever means for enforcing the independent rotary movement of said valve spool means to at least three distinct positions, said first and second lever means combined movements selectively providing at least seven operating positions.

\* \* \* \* \*